Aug. 20, 1968   W. F. SPLICHAL, JR   3,398,278
NEUTRON DETECTOR FOR MEASURING DOSE RATE
Filed Nov. 19, 1965
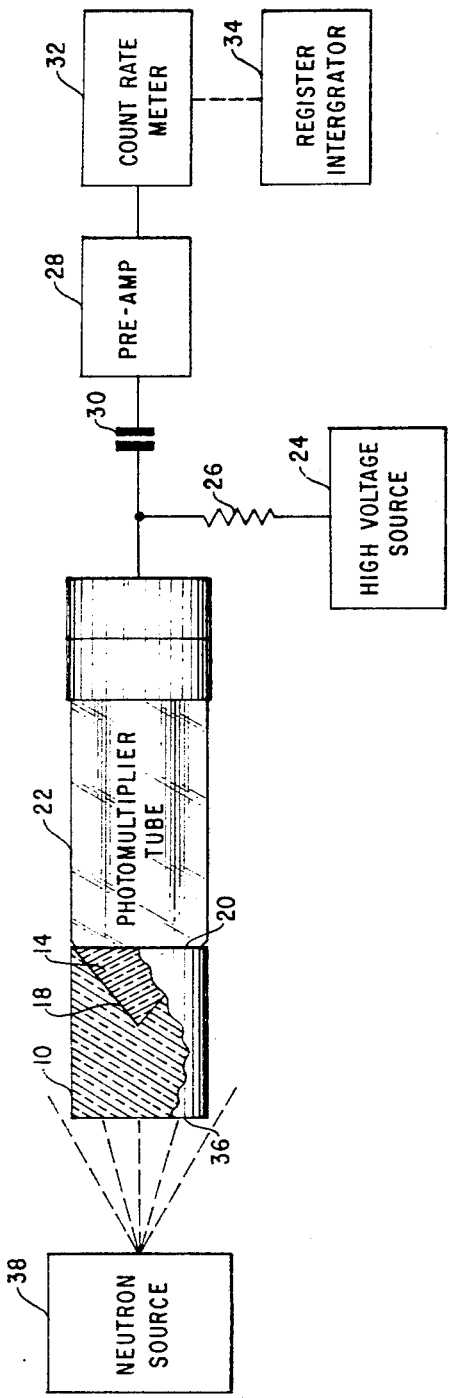
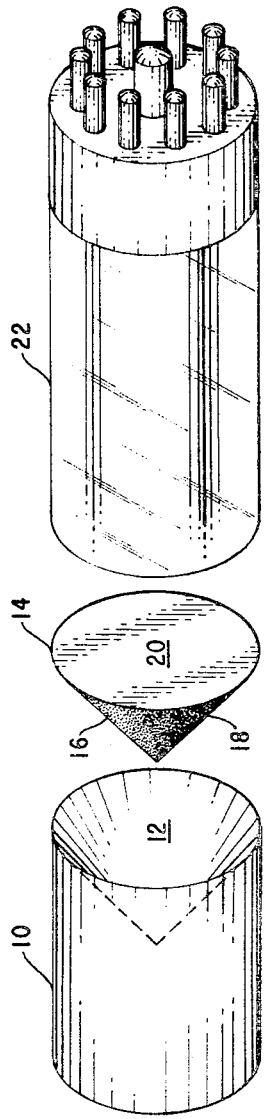
INVENTOR.
WILLIAM F. SPLICHAL JR.
BY
Attorney:

United States Patent Office 3,398,278
Patented Aug. 20, 1968

3,398,278
NEUTRON DETECTOR FOR MEASURING
DOSE RATE
William F. Splichal, Jr., North Augusta, S.C., assignor to the United States of America as represented by the United States Atomic Energy Commission
Filed Nov. 19, 1965, Ser. No. 508,872
10 Claims. (Cl. 250—71.5)

ABSTRACT OF THE DISCLOSURE

A neutron detector for neutron dose measurement. A cylindrical mass of neutron moderator material has a generally conical cavity in contact with a scintillation material and in mating relationship with a generally conical light pipe. The light pipe base is in contact with a photomultiplier tube and a suitable photomultiplier circuit. The conical cavity shape is such that a higher proportion of fastener entering neutrons are permitted to reach the vicinity of the scintillation material with sufficient energy to produce a quantity of recoil protons proportional to equivalent neutron dose in tissue.

The present invention relates to neutron detectors and more particularly to an improved fast neutron detector for measuring neutron dose rate.

Since neutrons are uncharged particles, they are difficult to detect directly. However, neutrons produce charged particles by collision with nuclei and thus may be detected and counted indirectly by conventional means. For instance, some of the fast neutrons entering a hydrogenous material produce recoil protons before they are slowed down (by successive collisions with the moderator) below the threshold energy for the n-p scattering reaction. Recoil protons born near and reaching a scintillator (before they are absorbed by the moderator) induce light pulses that can be counted.

Heretofore, neutrons have been detected using a scintillation crystal disposed on the end of a light pipe within a sphere of hydrogenous moderator material, such as polyethylene. The light pipe, which passes through a hole in the moderator sphere, serves as an optical coupling means between the scintillation crystal and a photomultiplier tube with associated circuitry. See Bramblett, Irving and Bonner, in Nuclear Instruments and Methods 9, 1 (1960). However, this prior art neutron detector is only useful over a limited range of neutron energies, unless a plurality of interchangeable spherical moderators having different diameters are used. Also, each sphere must be mounted upon a vertical light pipe and requires separate calibration for the energy level being detected. In operation, such detectors are cumbersome in that spheres as large as 12 inches in diameter are required, the spheres must be changed and calibrated periodically to maintain adequate accuracy, and finally the large spherical configuration of the detector prevents detection of neutrons in areas where space is limited. These disadvantages become more pronounced when the detector is used as a fast neutron dosimeter for measuring the equivalent neutron dose absorbed by human or animal tissue.

As used herein, the term dosimeter refers to a neutron detector which measures damage to tissue. The amount of damage is determined by the number and energy of the neutrons, i.e. the more energy, the more damage per neutron. For a neutron detector to serve as a dosimeter, it must not only count the neutrons but weight them in proportion to their energy.

It is, therefore, an object of the present invention to provide an improved neutron detection means. Another object is to provide a fast neutron detector for measuring equivalent neutron dose absorbed in human and animal tissue, particularly in the presence of gamma radiation. Other objects and advantages of the present invention will become apparent from a consideration of the following description of the invention and the appended drawings, wherein:

FIG. 1 is an exploded view in perspective of a preferred embodiment of the improved neutron detector; and FIG. 2 is a partial sectional view of the improved neutron detector together with a block diagram of a suitable counter circuit.

The above objects are accomplished in the present invention by providing an improved neutron detector for use in neutron dosimetry measurement which comprises a generally cylindrical mass of neutron moderator material having at one end a flat face and at the other end a symmetrical cavity in contact with a layer of scintillation material and in mating relationship with a light pipe; said cavity, scintillation material and light pipe defining a geometric configuration which permits an increase in scintillation perimeter for an increase in depth, from said flat face, within the moderator material. In use the flat face of the moderator material is directed toward a source of neutrons. It has been found that such a geometric configuration, which may include a generally cone-shaped or paraboloid-shaped geometric figure, is particularly suited to neutron dose measurement because it provides an enlarged scintillation area potentially responsive to protons resulting from the higher energy entering neutron bombardment of the hydrogenous moderator material with increasing distance from the flat face (plane of neutron entry) of the moderator material. This allows a greater number of light pulses (scintillations) to be produced by (n-p) scattering reactions from the faster entering neutrons than by the slower entering neutrons. The number of scintillations produced is proportional to dose; thereby providing a dosimeter to measure the dose rates from a variety of complex neutron energy spectra or an energy range of from about 0.2 to 10 million electron volts (mev.). The light pipe serves to optically couple the scintillation material to a photomultiplier means. The photomultiplier means is in contact with the base of the light pipe and is adapted to receive light pulses from the scintillation material. Electronic means are also provided for measuring the output of the photomultiplier means.

In FIGURES 1 and 2 the preferred embodiment of the present invention will be described with reference to a cone-shaped geometric configuration of the cavity, scintillation material and light pipe. Referring now to FIGURES 1 and 2, the preferred embodiment of the improved neutron detector for use as a dosimeter comprises a right cylindrical neutron moderator material 10 with a conical section removed at one end to define a conical cavity 12 having a base approximately the same diameter as the moderator material 10. A cone-shaped light pipe 14 is disposed with its conical surface 16 in mating relationship with the conical cavity 12. The preferred moderator material is any suitable hydrogenous material having a relatively high concentration of hydrogen nuclei (protons) to produce recoil protons when neutrons enter the material. Although many common hydrogen-containing materials may be used as neutron-moderator material, polyethylene is preferred because it is a solid, may be easily machined into the desired geometric shape and is particularly suited for the (n-p) scattering reaction.

Scintillation material is provided between the neutron-moderator material 10 and the light pipe 14 as a thin layer of proton-sensitive phosphor 18 disposed in the conical cavity 12 or on the conical surface 16 of light pipe 14. In this preferred embodiment the proton-sensitive phosphor 18 is shown as a thin coating or layer on conical surface 16. The preferred phosphor for the (n-p) reactor is ZnS(Ag) which is sprayed on the surface to a uniform thickness of several molecules (approximately 10 mg./cm.$^2$). A thin layer of ZnS(Ag) is preferred because the large ionization density produced by the protons in ZnS(Ag) permits easier electronic discrimination from the smaller pulses produced by gamma radiation.

The light pipe 14 is machined from any well known light pipe material, such as methylmethacrylate polymers available under the trade names of Lucite or Plexiglas. The base 20 of light pipe 14 which is approximately the same diameter as the base of cavity 12, is placed in intimate contact with a suitable photomultiplier tube 22 to provide optical coupling between the phosphor 18 and photomultiplier tube 22. Photomultiplier tube 22 is connected to a suitable counter circuit as shown by the block diagram of FIG. 2.

Those skilled in the art can readily devise a suitable circuit for counting the light pulses amplified in photomultiplier tube 22. One suitable circuit is illustrated in FIG. 2. Photomultiplier tube 22, which may be any suitable PM tube such as Dumont 6291 or 5991, is energized by a high-voltage source 24 which furnishes high-voltage direct current through signal developing or coupling resistor 26. Pulses occurring in the PM tube 22, as a result of light pulses passing through the light pipe 14 from the phosphor 18, are amplified in preamplifier 28 after being fed through coupling capacitor 30. It may be noted that capacitor 30 also serves to block direct current from the source 24 out of the input of preamplifier 28. Voltage pulses from preamplifier 28 are fed to a suitable count-rate meter 32 and register integrator circuit 34 for counting and scaling in a manner well known in the radiation counter art.

In operation, the neutron detector is disposed with the face 36 of the moderator material 10 pointing in the general direction of the neutron source 38 as shown in FIG. 2. Thus, neutrons entering the face 36 will enter from the direction of the vertex of the conical surface 16 so that a higher proportion of high energy entering neutrons passing through the greatest distance within the moderator will form recoil protons in the vicinity of the layer of phosphor 18. In using the detector as a dosimeter, this arrangement has the additional advantage of reducing the directional effects to a minimum.

While the exact shape and size of the moderator material and the light pipe are not critical to the operation of the detector, it is necessary to take several factors into consideration for use of the detector as a dosimeter; that is, for selecting dimensions of a detector for measuring equivalent neutron dose in tissue.

Factors which vary with energy for neutrons in the desired range (0.2 to 10 mev.) include the (n-p) scattering cross section, the tissue damage, and the neutron relaxation length. The geometric shape of the detector was empirically determined, using these factors, to achieve an approximate tissue response. These energy dependent factors indicate that between about 6 and 8 times more scintillation area is needed for the bottom half of the cone as compared to the top half. On this basis, a 1½ inch diameter neutron-moderator material about 1½ inches high produces the maximum number of (n-p) reactions with minimum leakage and a conical light pipe 1 inch high and 1½ inches in diameter coated with a 10 mg./cm.$^2$ layer of ZnS(Ag) provides a scintillation area with approximately 7 times greater area per unit of height at the base than at the vertex. It has been found that these dimensions provide a good approximation of neutron dose absorbed in tissue over the range of from 0.2 to 10 mev. with the additional advantage, as previously noted, that the conical surface affords enough symmetry to render the detector relatively insensitive to directional effects.

It will be apparent that many modifications of the invention will occur to those skilled in the art without departing from the scope of the invention as set forth in the appended claims.

What is claimed is:
1. An improved neutron detector including a neutron moderator material, a scintillation material, a light pipe and photomultiplier means, the improvement comprising a mass of said neutron moderator material having a cavity in contact with said scintillation material and in mating relationship with said light pipe; said cavity, scintillation material and light pipe defining a geometric surface which permits an increase in scintillation perimeter for an increase in depth within said moderator material.

2. The improvement of claim 1 wherein said cavity has a generally conical configuration.

3. An improved neutron detector comprising
    (a) a mass of neutron moderator material of generally cylindrical configuration having at one end a cavity of generally conical configuration,
    (b) a light pipe having a generally conical surface disposed in mating relationship with said moderator material and a base,
    (c) a layer of scintillation material disposed between and in contact with said cavity and said conical surface, and
    (d) photomultiplier means in contact with said base of said light pipe.

4. The improved neutron detector of claim 3, wherein said neutron moderator material is a hydrogen-containing material for producing recoil protons in the presence of a neutron source.

5. The improved neutron detector of claim 3, wherein said scintillation material is a proton-sensitive phosphor for emitting light pulses in response to recoil protons.

6. The improved neutron detector of claim 3 wherein said proton-sensitive phosphor is a thin layer of ZnS(Ag).

7. An improved neutron dosimeter including a neutron moderator material, a proton-sensitive phosphor, a light pipe, and photomultiplier means, the improvement comprising a mass of said moderator material having a cavity in contact with said phosphor and in mating relationship with said light pipe; said cavity, said phosphor and said light pipe having a geometric configuration which permits a higher proportion of faster entering neutrons to reach the vicinity of said phosphor with sufficient energy to produce a quantity of recoil protons proportional to an equivalent neutron dose in tissue.

8. A fast neutron dosimeter comprising
    (a) a mass of neutron moderator material of generally cylindrical configuration having at one end a cavity of generally conical configuration for producing recoil protons in the presence of a neutron source,
    (b) a light pipe having a generally conical surface disposed in mating relationship with said moderator material and a base,
    (c) a thin layer of proton-sensitive phosphor interposed between and in contact with said conical surface and said cavity for emitting light pulses in response to said recoil protons,
    (d) photomultiplier means in contact with said base of said light pipe adapted to receive said light pulses, and
    (e) means coupled to said photomultiplier means for energizing said photomultiplier means and for measuring the magnitude of said light pulses.

9. The fast neutron dosimeter of claim 7, wherein said thin layer of proton-sensitive phosphor is the compound ZnS(Ag).

10. The fast neutron dosimeter of claim 7, wherein said cavity and said light pipe have a generally conical configuration which permits a higher proportion of faster entering neutrons to reach said phosphor with sufficient energy to produce a quantity of recoil protons proportional to equivalent neutron dose in tissue.

References Cited

UNITED STATES PATENTS

| 2,681,416 | 6/1954 | Thompson | 250—71.5 |
| 2,900,516 | 8/1959 | Davis et al. | 250—71.5 |

RALPH G. NILSON, *Primary Examiner.*

M. J. FROME, *Assistant Examiner.*